United States Patent
Meir et al.

(10) Patent No.: US 9,262,315 B2
(45) Date of Patent: Feb. 16, 2016

(54) UNEVEN WEAR LEVELING IN ANALOG MEMORY DEVICES

(71) Applicant: Apple Inc., Cupertino, CA (US)

(72) Inventors: Avraham Poza Meir, Rishon Le-Zion (IL); Eyal Gurgi, Petah-Tikva (IL); Shai Ojalvo, Moshav Olesh (IL); Yoav Kasorla, Kfar Netar (IL); Naftali Sommer, Rishon Le-Zion (IL)

(73) Assignee: Apple Inc., Cupertino, CA (US)

( * ) Notice: Subject to any disclaimer, the term of this patent is extended or adjusted under 35 U.S.C. 154(b) by 287 days.

(21) Appl. No.: 13/935,746

(22) Filed: Jul. 5, 2013

(65) Prior Publication Data

US 2015/0012686 A1    Jan. 8, 2015

(51) Int. Cl.
    *G06F 12/00*      (2006.01)
    *G06F 12/02*      (2006.01)

(52) U.S. Cl.
    CPC ................................. *G06F 12/0246* (2013.01)

(58) Field of Classification Search
None
See application file for complete search history.

(56) References Cited

U.S. PATENT DOCUMENTS

| | | | |
|---|---|---|---|
| 7,865,761 B1 | 1/2011 | Chilton | |
| 7,917,689 B2 | 3/2011 | Rothman | |
| 8,001,318 B1* | 8/2011 | Iyer et al. | 711/103 |
| 8,335,886 B2 | 12/2012 | Lee | |
| 8,356,152 B2 | 1/2013 | You | |
| 2010/0174845 A1 | 7/2010 | Gorobets | |
| 2013/0339570 A1* | 12/2013 | Franceschini et al. | 711/102 |

* cited by examiner

*Primary Examiner* — Brian Peugh
(74) *Attorney, Agent, or Firm* — Meyertons, Hood, Kivlin, Kowert & Goetzel, P.C.

(57) ABSTRACT

A method for data storage in a memory that includes multiple analog memory cells, includes defining, based on a characteristic of the memory cells, an uneven wear leveling scheme that programs and erases at least first and second subsets of the memory cells with respective different first and second Programming and Erasure (P/E) rates. Data is stored in the memory in accordance with the uneven wear leveling scheme.

13 Claims, 5 Drawing Sheets

FIG. 4A
| P/E CYCLES | MEMORY CELLS |
|---|---|
| 3K | ZONE1 10% OF CELLS |
| 1K | ZONE2 90% OF CELLS |
FIG. 4B
| ADDITIONAL P/E CYCLES | MEMORY CELLS |
|---|---|
| 0K -UNDERGOING REJUVENATION | ZONE1 10% OF CELLS |
| +2K | ZONE3 10% OF CELLS |
| +2/3K | ZONE2 80% OF CELLS |
FIG. 4C
| ADDITIONAL P/E CYCLES | MEMORY CELLS |
|---|---|
| +2K | ZONE1 10% OF CELLS |
| 0K -UNDERGOING REJUVENATION | ZONE3 10% OF CELLS |
| +2/3K | ZONE2 80% OF CELLS |

UNEVEN WEAR LEVELING IN ANALOG MEMORY DEVICES

FIELD OF THE INVENTION

The present invention relates generally to memory devices, and particularly to methods and systems for memory cell wear leveling.

BACKGROUND OF THE INVENTION

Several types of memory devices, such as Flash memories, use arrays of analog memory cells for storing data. Each analog memory cell stores a quantity of an analog value, also referred to as a storage value, such as an electrical charge or voltage. This analog value represents the information stored in the cell. In Flash memories, for example, each analog memory cell holds a certain amount of electrical charge. The range of possible analog values is typically divided into intervals, each interval corresponding to one or more data bit values. Data is written to an analog memory cell by writing a nominal analog value that corresponds to the desired bit or bits.

Some memory devices, commonly referred to as Single-Level Cell (SLC) devices, store a single bit of information in each memory cell, i.e., each memory cell can be programmed to assume either of two possible programming levels. Higher-density devices, often referred to as Multi-Level Cell (MLC) devices, store two or more bits per memory cell, i.e., can be programmed to assume more than two possible programming levels.

The performance of some types of analog memory cells deteriorates as a function of use (e.g., as a function of the number (or rate) of Programming and Erasure (P/E) cycles applied to the cells). This property is sometimes referred to as cell wearing. Some data storage techniques attempt to distribute cell wearing evenly among different groups of memory cells. These techniques are commonly referred to as wear leveling techniques.

PCT International Publication WO 2008/077284, whose disclosure is incorporated herein by reference, describes a wear leveling method for non-volatile memory. An embodiment includes counting erase cycles for each of a set of multiple memory blocks of a non-volatile memory, including incrementing a first count for a physical block address of the memory block. If the memory block is not a spare memory block, a second count for a logical block address of the memory block is incremented. The method also determines whether the memory has uneven wear of memory blocks based on the counting of the erase cycles of the plurality of memory blocks.

U.S. Patent Application Publication 2007/0208904, whose disclosure is incorporated herein by reference, describes a wear leveling apparatus, which uniformly distributes wear over a nonvolatile memory containing a plurality of memory blocks. The apparatus includes a memory unit for storing a record of cold block candidates in the nonvolatile memory and a control unit configured to update the memory unit and release the cold block candidates under a threshold condition. The control unit selects a new memory block to replace one cold block candidate in the memory unit when the cold block candidate is matched with a written address in a write command for the nonvolatile memory. The cold block candidates remaining in the memory unit are identified as cold blocks when the nonvolatile memory has been written more than a predetermined write count threshold. The memory blocks with infrequent erasure can be identified and released to uniformly distribute wear over the nonvolatile memory.

U.S. Pat. No. 6,230,233, whose disclosure is incorporated herein by reference, describes a mass storage system made of Flash memory cells organized into blocks, the blocks in turn being grouped into memory banks. The system is managed to even out the numbers of erase and rewrite cycles experienced by the memory banks in order to extend the service lifetime of the system. Relative use of the memory banks is monitored and, in response to detection of uneven use, memory banks have their physical addresses periodically swapped for each other in order to even out their use over the lifetime of the memory.

U.S. Pat. No. 7,441,067, whose disclosure is incorporated herein by reference, describes a re-programmable non-volatile memory system, such as a Flash system, having its memory cells grouped into blocks of cells that are simultaneously erasable. The system is operated in a manner to level out the wear of the individual blocks through repetitive erasing and re-programming. Wear leveling may be accomplished without use of counts of the number of times the individual blocks experience erase and re-programming but such counts can optionally aid in carrying out the wear leveling process. Individual active physical blocks are chosen to be exchanged with those of an erased block pool in a predefined order.

U.S. Pat. No. 7,865,761, whose disclosure is incorporated herein by reference, describes a data storage apparatus includes a set of memory modules, an interface and a main controller coupled to the each memory module and to the interface. The interface is arranged to communicate with a set of external devices. The main controller is arranged to (i) store data within and (ii) retrieve data from the memory of the set of memory modules in an uneven manner on behalf of the set of external devices to unevenly wear out the memory modules over time.

SUMMARY OF THE INVENTION

An embodiment of the present invention provides a method including identifying, in a memory that includes multiple analog memory cells, based on a characteristic of the memory cells, an uneven wear leveling scheme that programs and erases at least first and second subsets of the memory cells with respective different first and second Programming and Erasure (P/E) rates. Data is stored in the memory in accordance with the uneven wear leveling scheme.

In some embodiments, the characteristic includes readout latency from the memory cells, and defining the uneven wear leveling scheme includes assigning the first subset of the memory cells for low-latency readout, assigning the second subset of the memory cells for normal-latency readout, and setting the first P/E rate to be lower than the second P/E rate. In other embodiments, the characteristic includes a dependence of a loss in storage capacity of the memory cells on a P/E cycle count of the memory cells. In yet other embodiments, the dependence of the loss in storage capacity on the P/E cycle count is a non-decreasing and concave shaped function.

In an embodiment, defining the uneven wear leveling scheme includes identifying that the first subset of the memory cells meets a wear-out criterion, and rejuvenating the memory cells in the first subset by temporarily suspending programming and erasure of the first subset. In another embodiment, the first P/E rate is set to a higher level than the second P/E rate.

There is additionally provided, in accordance with an embodiment of the present invention, apparatus including a memory, which includes multiple analog memory cells, and storage circuitry. The storage circuitry is configured to define, based on a characteristic of the memory cells, an uneven wear leveling scheme that programs and erases at least first and second subsets of the memory cells with respective different first and second Programming and Erasure (P/E) rates, and to store data in the memory in accordance with the uneven wear leveling scheme.

There is additionally provided, in accordance with an embodiment of the present invention, apparatus for data storage, including an interface, which is configured to communicate with a memory including multiple analog memory cells, and storage circuitry. The storage circuitry is configured to define, based on a characteristic of the memory cells, an uneven wear leveling scheme that programs and erases at least first and second subsets of the memory cells with respective different first and second Programming and Erasure (P/E) rates, and to store data in the memory in accordance with the uneven wear leveling scheme.

The present invention will be more fully understood from the following detailed description of the embodiments thereof, taken together with the drawings in which:

BRIEF DESCRIPTION OF THE DRAWINGS

FIGS. 4A-4C are diagrams that schematically illustrate an uneven wear leveling technique for rejuvenation of memory cells, in accordance with an embodiment of the present invention.

DETAILED DESCRIPTION OF EMBODIMENTS

Overview

Figure 1:
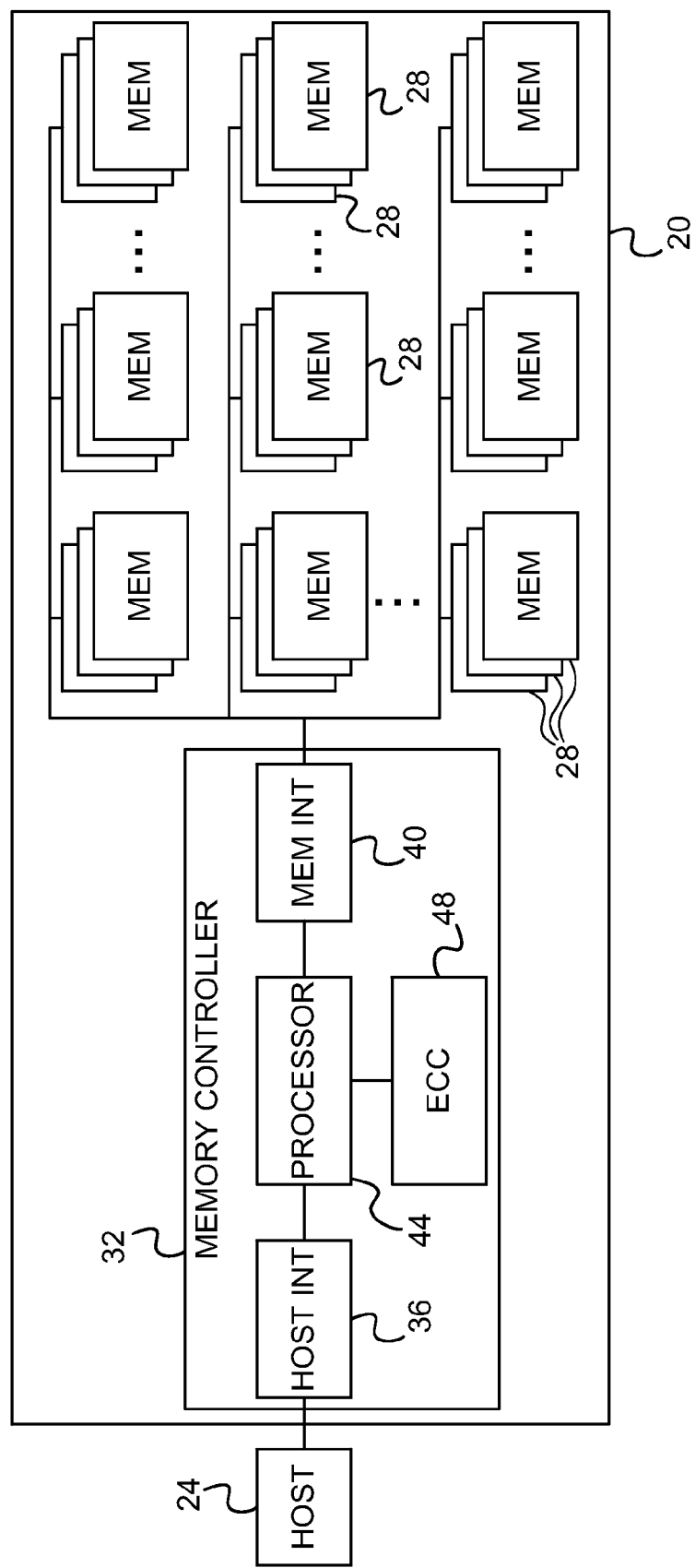
FIG. 1 is a block diagram that schematically illustrates a memory system, in accordance with an embodiment of the present invention.

The performance of some types of analog memory cells degrades with use (e.g., as a function of the number of Programming and Erasure—P/E—cycles applied to the cells). This phenomenon is commonly referred to as cell wearing. In some cases, the storage capacity of the cells deteriorates as a function of their wear level. At some point, a certain group of cells may become unusable due to extensive wearing. The average number of P/E cycles applied to a cell over a time unit is referred to herein and in the claims as a P/E rate. Thus, the more P/E cycles applied per second, the higher the P/E rate. Moreover, with higher P/E rates memory cells typically deteriorate faster.

Embodiments of the present invention that are described herein below provide improved methods and systems for enhancing the performance of a memory device during its lifetime, such as maintaining a short readout latency, extending the lifetime period, and increasing the net capacity. The disclosed methods and systems use uneven wear leveling techniques, i.e., intentionally apply different P/E rates to memory cells located in different memory areas.

As cells gradually deteriorate, signal processing techniques are typically incorporated to combat the reliability degradation. Such techniques may include, for example, error correction, adaptive tuning of the memory read thresholds, and interference cancellation wherein the effect of neighboring cells is estimated and canceled in order to improve reliability. Since such techniques typically involve heavy computational efforts, readout performance degrades (e.g., latency increases) significantly as the cells wear out. In an embodiment that is described in detail below, a relatively small subset of the memory cells is assigned to data that should be read with small latency. During the lifetime of the device, cells in that subset are configured to a much lower P/E rate (and therefore to a slower aging rate) in comparison with other cells. As the device ages or even approaches its end of life, the subset in question still provides fast readout.

In another embodiment that is described below, the memory cells are divided into two subsets configured to different P/E rates. As long as the function relating the net capacity loss to the number of P/E cycles is non-decreasing and concave, the method enables higher memory capacity relative to even wear leveling.

In some embodiments, a group of worn out cells may be rejuvenated by refraining from programming it for a certain period of time. Certain aspects of memory cell rejuvenation are addressed, for example, in U.S. Pat. No. 8,248,831, whose disclosure is incorporated herein by reference. In other embodiments that are described herein, a relatively small subset of the memory cells is intentionally configured to a higher P/E rate. When that subset is worn out, the memory controller allows it to rejuvenate by temporarily inhibiting programming, while another subset of memory cells is assigned to a high P/E rate. When a worn out subset spontaneously heals, it is put back in service, thus extending the total number of P/E cycles that may be applied to cells in that subset.

The methods and systems described herein provide improved usability of a memory device during its lifetime, by applying uneven wear leveling techniques. In one aspect, the disclosed techniques enable low latency readout operations in at least a subset of the memory cells, even as the device ages towards its end of life. In another aspect, the techniques increase the capacity of the memory device at all times during its lifetime. In yet another aspect, the overall number of P/E cycles is increased, thus extending the device's lifetime period.

System Description

FIG. 1 is a block diagram that schematically illustrates a multi-device memory system 20, in accordance with an embodiment of the present invention. System 20 accepts data for storage from a host 24 and stores it in memory, and retrieves data from memory and provides it to the host. In the present example, system 20 comprises a Solid-State Disk (SSD) that stores data for a host computer. In alternative embodiments, however, system 20 may be used in any other suitable application and with any other suitable host, such as in computing devices, cellular phones or other communication terminals, removable memory modules such as Disk-On-Key (DOK) devices, Secure Digital (SD) cards, Multi-Media Cards (MMC) and embedded MMC (eMMC), digital cameras, music and other media players and/or any other system or device in which data is stored and retrieved.

System 20 comprises multiple memory devices 28, each comprising multiple analog memory cells. In the present example, devices 28 comprise non-volatile NAND Flash devices, although any other suitable memory type, such as NOR and Charge Trap Flash (CTF) Flash cells, phase change RAM (PRAM, also referred to as Phase Change Memory—PCM), Nitride Read Only Memory (NROM), Ferroelectric RAM (FRAM), magnetic RAM (MRAM) and/or Dynamic RAM (DRAM) cells, can also be used.

In the context of the present patent application and in the claims, the term "analog memory cell" is used to describe any memory cell that holds a continuous, analog value of a physical parameter, such as an electrical voltage or charge. Any suitable type of analog memory cells, such as the types listed above, can be used. In the present example, each memory device 28 comprises a non-volatile memory of NAND Flash cells. The charge levels stored in the cells and/or the analog voltages or currents written into and read out of the cells are referred to herein collectively as analog values or storage values. Although the embodiments described herein mainly address threshold voltages, the methods and systems described herein may be used with any other suitable kind of storage values.

System 20 stores data in the analog memory cells by programming the cells to assume respective memory states, which are also referred to as programming levels. The programming levels are selected from a finite set of possible levels, and each level corresponds to a certain nominal storage value. For example, a 2 bit/cell MLC can be programmed to assume one of four possible programming levels by writing one of four possible nominal storage values into the cell.

The memory cells are typically arranged in rows and columns. Typically, a given memory device comprises multiple erasure blocks (also referred to as memory blocks), i.e., groups of memory cells that are erased together. Data typically cannot be reprogrammed in-place, and memory blocks are therefore erased before being programmed with other data.

Each memory device 28 may comprise a packaged device or an unpackaged semiconductor chip or die. A typical SSD may comprise a number of 4 GB devices. Generally, however, system 20 may comprise any suitable number of memory devices of any desired type and size. Although the system configuration of FIG. 1 comprises multiple memory devices, some of the methods and systems described herein can also be used in systems having only a single memory device.

System 20 comprises a memory controller 32, which accepts data from host 24 and stores it in memory devices 28, and retrieves data from the memory devices and provides it to the host. Memory controller 32 comprises a host interface 36 for communicating with host 24, a memory interface 40 for communicating with memory devices 28, and a processor 44 that processes the stored and retrieved data. In some embodiments, controller 32 encodes the stored data with an Error Correction Code (ECC). In these embodiments, controller 32 comprises an ECC unit 48, which encodes the data before stored in devices 28 and decodes the ECC of data retrieved from devices 28. The functions of processor 44 can be implemented, for example, using software running on a suitable Central Processing Unit (CPU), using hardware (e.g., state machine or other logic), or using a combination of software and hardware elements.

In some embodiments, memory controller 32 maps user logical addresses into memory physical addresses. By using such mapping, the memory controller may apply different P/E rates to different physical memory regions, irrespective of the logical addressing used by the host.

Memory controller 32, and in particular processor 44, may be implemented in hardware. Alternatively, the memory controller may comprise a microprocessor that runs suitable software, or a combination of hardware and software elements. In some embodiments, processor 44 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

The system configuration of FIG. 1 is an example configuration, which is shown purely for the sake of conceptual clarity. Any other suitable memory system configuration can also be used. Elements that are not necessary for understanding the principles of the present invention, such as various interfaces, addressing circuits, timing and sequencing circuits and debugging circuits, have been omitted from the figure for clarity.

In the exemplary system configuration shown in FIG. 1, memory devices 28 and memory controller 32 are implemented as separate Integrated Circuits (ICs). In alternative embodiments, however, the memory devices and the memory controller may be integrated on separate semiconductor dies in a single Multi-Chip Package (MCP) or System on Chip (SoC), and may be interconnected by an internal bus. Further alternatively, some or all of the memory controller circuitry may reside on the same die on which one or more of the memory devices are disposed. Further alternatively, some or all of the functionality of memory controller 32 can be implemented in software and carried out by a processor or other element of the host system, or by any other type of memory controller. In some embodiments, host 24 and Memory controller 32 may be fabricated on the same die, or on separate dies in the same device package.

Analog Memory Cells and Wear Leveling Techniques

The performance of analog memory cells often deteriorates as a function of their wear level, e.g., as a function of the number of Programming and Erasure (P/E) cycles applied to the cells. For example, in Flash memory, charge traps are formed at the boundary of the floating gate within the cell as the cells are being used. These charge traps accumulate with use and gradually degrade the storage capacity of the memory cells. In some cases, a group of memory cells (e.g., a block) may become unusable after a certain number of P/E cycles.

In the context of the present patent application, the term "wear level" refers to a measure of the cumulative amount of use of a memory cell or group of memory cells, or to a measure of the change in the performance of the cell or cells due to such use. For example, the wear level of a group of cells can be quantified as the number of P/E cycles applied to the cells since the memory device was manufactured. Alternatively, wear level can be measured or quantified using any other suitable means.

In some cases, the wear level of a group of cells can actually improve over time. For example, in Flash memory, when no P/E operations are performed on the cells for a long period of time, charge de-trapping may occur. As a result, the wear level of cells may improve if the cells are not accessed for a long time period.

In some embodiments that are described herein, memory controller 32 applies uneven wear leveling to improve the memory device usability. In other words, over a given time period, memory controller 32 may apply a different number of P/E cycles to cells located at different areas of the memory. In general, a certain configuration of the P/E rate to control cell wearing is referred to as a wear leveling scheme.

Maintaining a Subset of Memory Cells Having Low Latency Readout

During the lifetime of a memory device, the memory cells typically undergo a cumulative increasing number of P/E cycles. As a result, the performance of cells or groups of cells deteriorates, and the reliability of the device degrades significantly. Various signal processing techniques may be used to maintain storage reliability in spite of cell wearing. For example, memory controller 32 may apply an error correcting code (ECC) to the stored data, or adaptively adjust read threshold levels, to compensate for the physical wear of the cells. Such signal processing techniques typically involve heavy computational efforts, and therefore increase the latency of readout operations considerably. The readout latency is a fundamental characteristic of the memory cells.

Figure 2A:
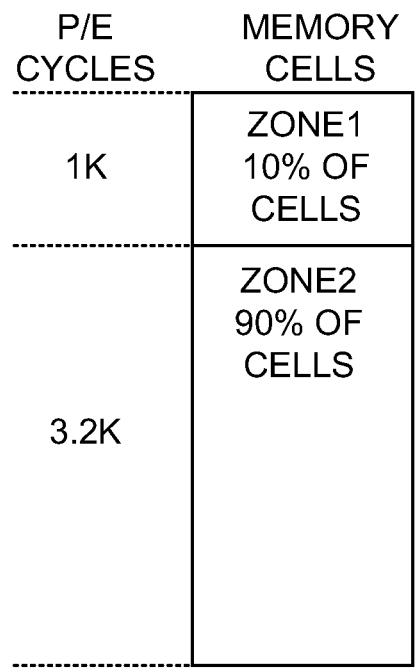
FIGS. 2A and 2B are a diagram and a flow chart, respectively, that schematically illustrate a method for enhancing the readout latency of some memory cells using uneven wear leveling, in accordance with an embodiment of the present invention.
Figure 2B:
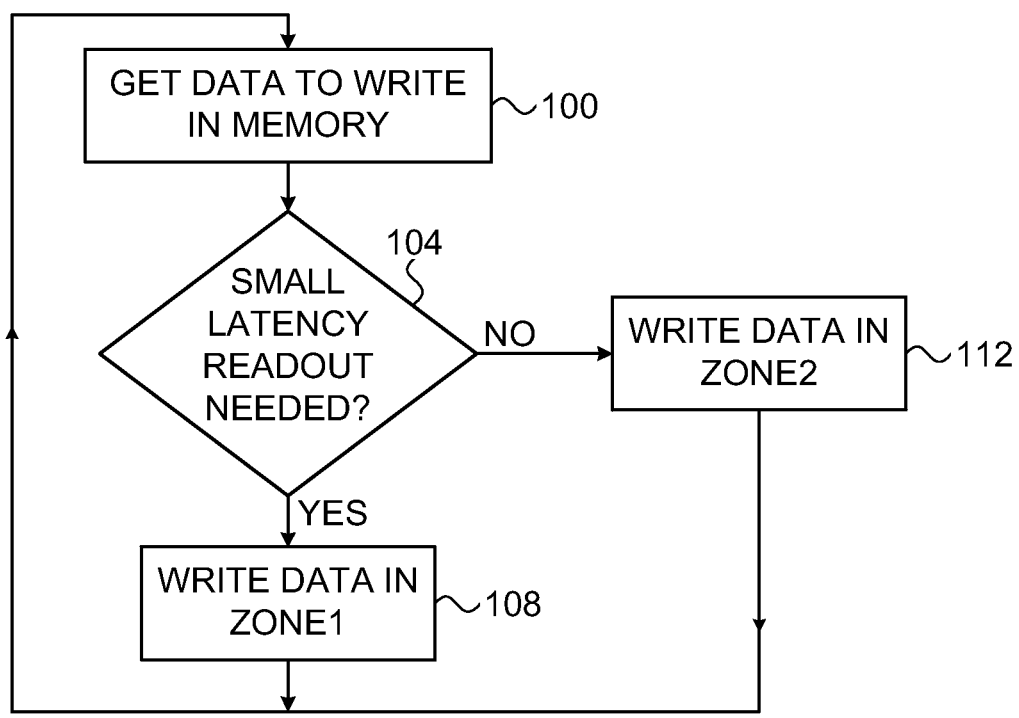

FIGS. 2A and 2B are a diagram and a flow chart that schematically illustrate a method for enhancing the readout latency of some memory cells, in accordance with an embodiment of the present invention. FIG. 2A depicts a set of memory cells, divided into subsets (zones) denoted ZONE1 and ZONE2. ZONE1 and ZONE2 together may represent the memory cells of a single memory device 28 or the total cells of all devices 28. Alternatively ZONE1 and ZONE2 together may comprise any suitable subset of the aggregated memory cells of units 28.

In the example of FIG. 2A, ZONE1 and ZONE2 comprise 10% and 90% of the memory cells, respectively. In addition, the figure depicts the number of P/E cycles applied to the cells in each zone over a time period since the device was initially put in use. Thus, in the present example, during that time period the memory controller applies 3.2K P/E cycles to cells in ZONE2 and only 1K cycles to cells in ZONE2. In a comparable even wear leveling scheme, the memory controller applies 3K P/E cycles to cells in both zones, i.e., an even P/E rate.

If for example, after about 2.5K P/E cycles in a certain group of cells the controller must incorporate signal processing techniques to maintain reliability, the readout latency of the memory cells would increase considerably. When using even wear leveling, all cells would be subject to this latency increase.

Returning now to the example in FIG. 2A, over the same time period the memory controller applies approximately the same average number of P/E cycles as in the comparable even wear leveling scheme, since 1K*10%+3.2K*90%≈3K. The advantage of the scheme of FIG. 2A, however, is that the memory controller may apply to cells in ZONE1 extra 1.5K P/E cycles before incorporating signal processing techniques. In other words, the memory cells in ZONE1 provide small readout latency for a considerably longer time. The cells in ZONE2 get only a slightly higher P/E rate (3.2K cycles with respect to 3K cycles) and therefore the period before the memory controller starts applying signal processing techniques in ZONE2 decreases roughly by only 6%.

The usage of uneven P/E rate configuration, as illustrated in FIG. 2A, thus enables low latency readout in some of the memory cells that would not be possible with even wear leveling. It should be appreciated that the configuration depicted in FIG. 2A is an exemplary configuration and that other suitable configurations may be used. For example, the memory controller can configure ZONE1 and ZONE2 to comprise 20% and 80% of the cells respectively, and apply 1K and 3.5K P/E cycles to the respective zones over some time period.

As another example, the memory controller may configure more than two zones, each with a predefined lower P/E rate. For example, assume a three zones configuration, wherein ZONE2 comprises 80% of the cells and ZONE1 comprises 20% of the cells. In addition assume that ZONE1 is split into two subsets ZONE1a and ZONE1b that are equal in size. Over some time period, the memory controller applies 1K P/E cycles to cells in ZONE1a, 1.5K cycles to cells on ZONE1b, and about 3.44K cycles to cells in ZONE2.

Memory system 20 may benefit from such uneven configuration by writing data that is classified as critical or sensitive to readout latency to dedicated zones. In the three-zone example, the data that is most sensitive to readout latency would be written to cells in ZONE1a and data of somewhat less sensitivity would be written to cells in ZONE1b. Alternatively, the memory controller may divide the memory cells into any suitable number of subsets that are configured to respective suitable P/E rates.

FIG. 2B is a flowchart that schematically illustrates a method that memory controller 32 may apply along with the memory configuration of FIG. 2A, in accordance with an embodiment of the present invention. The method of FIG. 2B begins with memory controller 32 getting data to write, at a write data step 100. The size of the data to be written may fit for example a page, a block, or any other suitable data size.

Memory controller 32 checks if the data should have small latency readout, at a check latency step 104. In case the data is classified as small latency readout data, the memory controller writes the data to available cells in ZONE1, at a write to ZONE1 step 108. Otherwise, the memory controller writes the data to available cells in ZONE2, at a write to ZONE2 step 112.

Memory controller 32 may use any suitable method to indicate to the memory devices whether the data is destined to ZONE1. For example, data classification into zones may be based on respective memory addressing. After writing the data at step 108 or 112, the memory controller loops back to step 100 to get subsequent data to write.

Later during the memory lifetime, data stored in ZONE2 may be read with increased readout latency, while data stored in ZONE1 would still be read with low latency. It would be appreciated that the method of FIG. 2B may be readily extended to any suitable number of subsets of memory cells configured to respective suitable P/E rates, as described in an example of FIG. 2A above.

Increasing Net Capacity Using Uneven Wear Leveling

During the lifetime of memory devices 28, memory controller 32 typically applies a cumulative increasing number of P/E cycles to the memory cells. As a result, the wear level of the cells increases and at some point in time the memory controller starts incorporating signal processing techniques to maintain storage reliability. Such techniques however, may utilize some of the memory cells and therefore degrade the net memory capacity available to user data.

As an example, when the memory controller applies error correcting codes, for example using ECC unit 48, extra parity bits are stored in addition to the data bits. Moreover, as cells further age, the controller may have to apply stronger ECC with additional parity bits to maintain high reliability. As another example, techniques to adaptively adjust shifts in read threshold levels, may need to store in some memory cells information related to an estimation of statistical or other attributes of these thresholds, and for storing values that are used in compensating for thresholds shifts. As yet another example, loss of net capacity may result when the memory controller acts to restore reliability by reducing cells capacity, for example, from 3 bits/cell to 2 bits/cell.

Figure 3A:
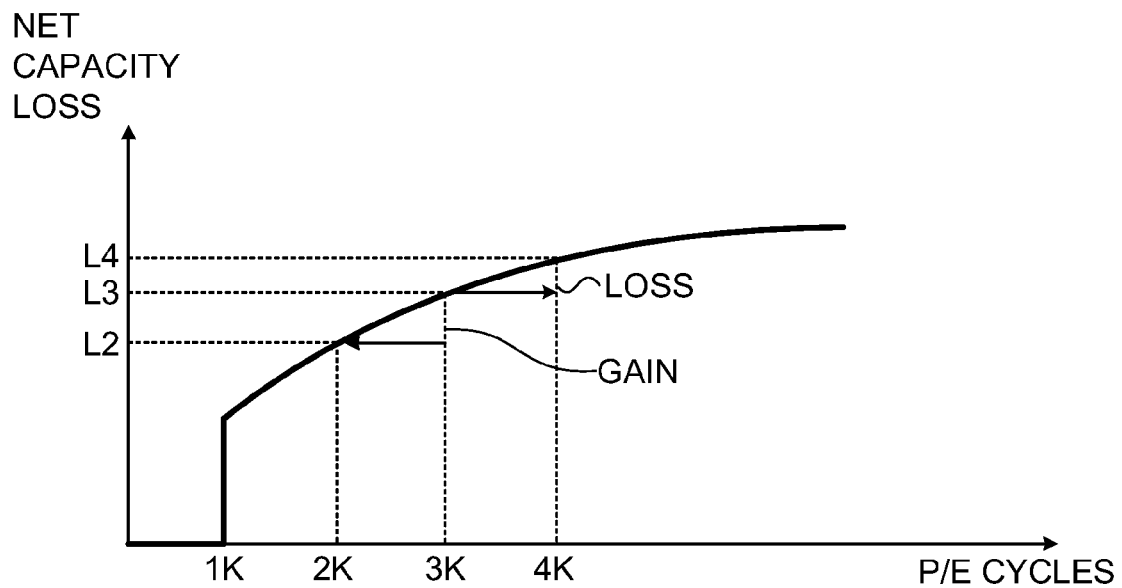
FIGS. 3A and 3B are diagrams that schematically illustrate an uneven wear leveling technique that improves net memory capacity, in accordance with an embodiment of the present invention.

FIG. 3A graphically depicts a function or a relationship that may exist between the memory net capacity loss and the cumulative number of applied P/E cycles. Such a relationship may hold for a group of memory cells, e.g., a block of cells or a group of blocks. Capacity loss may be measured for example in units of bytes, bits per cell, or any other suitable units. The function in FIG. 3A is a monotonically non decreasing function, i.e., as the memory controller applies additional P/E cycles, the capacity loss increases or at least does not decrease. Such a function/dependence is a fundamental characteristic of the memory cells.

In the presented example, below 1K P/E cycles the memory has little or no capacity loss. Above 1K P/E cycles the capacity loss monotonically increases as a function of cumulative P/E cycles. Assume now two configuration modes. In a nominal mode, the controller applies a cumulative number of 3K P/E cycles to all the memory cells during a given period of time. The corresponding capacity loss is denoted L3 in the figure. In the other configuration mode, the controller applies 2K to 50% of the memory cells and 4K P/E cycles to the other 50%. The corresponding capacity losses are denoted L2 and L4 in the figure.

By reducing from 3K to 2K P/E cycles, there is a capacity gain that is equal to L3−L2. Similarly, by increasing from 3K to 4K P/E cycles, there is a capacity loss that is equal to L4−L3. Since the shape of the function in the figure is concave, it turns out that L3−L2>L4−L3. In other words, in the present example the overall capacity gain is higher than the capacity loss. As described below, such behavior can be utilized together with uneven wear leveling to increase the overall net capacity.

It should be appreciated that the function depicted in FIG. 3A is only an exemplary function. Any other capacity loss function that fulfills the two requirements, i.e., (1) monotonically non-decreasing and (2) concave shaped, may be suitable as well.

Figure 3B:
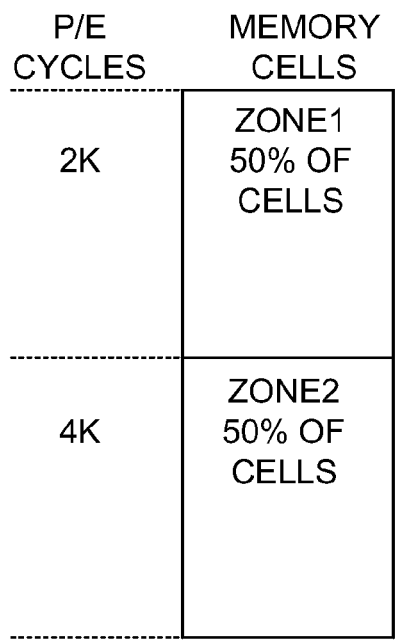

FIG. 3B illustrates a set of memory cells split into two subsets of equal size denoted ZONE1 and ZONE2. As depicted in the figure, over a given time period, memory controller 32 unevenly applies 2K P/E cycles to cells in ZONE1 and 4K cycles to cells in ZONE2. The average number of P/E cycles applied over the given time period is therefore 2K*50%+4K*50%=3K. Additionally, assume the relationship between net capacity loss and cumulative P/E cycles fulfills the two requirements defined above for functions as in FIG. 3A.

Under such configuration and conditions, the capacity gain, relative to evenly applying 3K cycles on average to cells in both zones, surpasses the corresponding capacity loss. Therefore, the described configuration enables an increase of the net capacity relative to even wear leveling configuration that would apply 3K P/E cycles to all cells.

It would be appreciated that the configuration depicted in FIG. 3B serves as an example only, and other configurations may be used. As an example, memory controller 32 may configure 40% and 60% of the cells to ZONE1 and ZONE2 respectively, and apply 2.2K P/E cycles over a given time period to cells in ZONE1 and 3.6K cycles to cells in ZONE2 (yielding approximately 3K cycles on average but with a capacity gain). Alternatively, the memory controller may divide the memory cells into any other suitable number of subsets and apply suitable respective number of P/E cycles at each subset to achieve a total capacity gain.

Selective Rejuvenation of Memory Cell Groups Using Uneven Wear Leveling

Extensive use of analog memory cells sometimes causes aging effects in the cells physical memory media, which causes the storage quality of the memory cells to deteriorate. In NAND Flash memory cells, for example, charge trapping at the boundary of the floating gate within memory cells decreases the floating gate isolation, and may cause read errors and increase the memory cells sensitivity to interference and charge loss. In some practical cases, refraining from programming the memory cells, e.g., for a period of between forty-eight hours and one week, causes sufficient charge detrapping. The method of leaving memory cells aside to spontaneously heal is referred herein below as rejuvenation.

FIGS. 4A-4C are diagrams that schematically illustrate an uneven wear leveling technique with rejuvenation of memory cells, in accordance with an embodiment of the present invention.

FIG. 4A illustrates a set of memory cells that is divided into subsets ZONE1 and ZONE2. In the present example ZONE1 and ZONE2 comprise 10% and 90% of the memory cells respectively. ZONE1 is intentionally configured to a P/E rate that is three times higher than the nominal P/E rate in ZONE2. After a given time period since system 20 starts to write data to the memory, memory controller 32 cumulatively applies 1K P/E cycles to cells in ZONE2 and about 3K cycles to cells in ZONE1. In the present example, assume that after 3K cycles the cells in ZONE1 degrade to an intolerable level. At this point, the memory controller puts the cells of ZONE1 out of service and assigns another memory subset to an increased P/E rate.

FIG. 4B describes the updated memory area configuration. ZONE1 is now out of service and is allowed to spontaneously rejuvenate. ZONE3 is the new subset of memory cells configured to a higher P/E rate, and ZONE2 is left with 80% of the cells at the nominal P/E rate. After applying additional 2K P/E cycles to cells in ZONE3 they become worn out as they reach a cumulative number of 3K P/E cycles. Since the P/E rate in ZONE2 is three times lower, the memory controller applies in ZONE2 only about ⅔K additional cycles during the same period. Thus, the memory controller may apply additional ⅓K of P/E cycles to cells in ZONE2 before reaching end of life. As ZONE3 is now worn out, it is put aside for rejuvenation.

In the present example, it is assumed that at the point where ZONE3 is worn out, the cells in ZONE1 are already rejuvenated and therefore in FIG. 4C ZONE3 is at rejuvenation state and ZONE1 is put back in service. As this is the second service period of ZONE1 after rejuvenation, it is assumed in FIG. 4C that ZONE1 can go through only 2K extra P/E cycles before put to rejuvenation again. It should be appreciated however that the presented technique enabled reusing ZONE1 to some extent and therefore extend the overall lifetime of the memory device.

The configurations depicted in FIGS. 4A-4C are only exemplary configurations. Any other memory configurations with any suitable number of subsets of the memory cells configured to respective suitable P/E rates may be used.

Figure 5A:
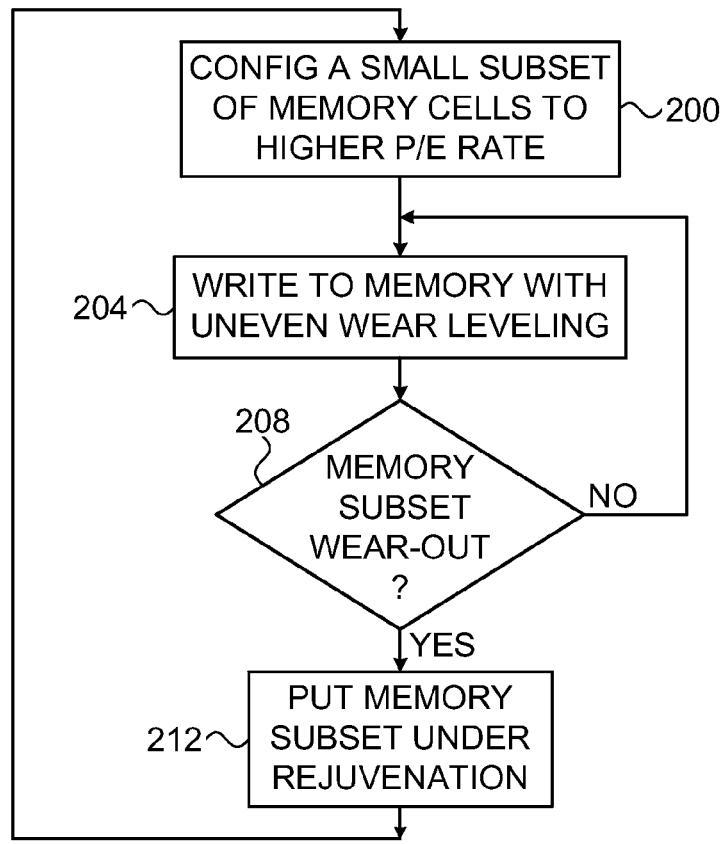
FIGS. 5A and 5B are flow charts that schematically illustrate an uneven wear leveling method for rejuvenation of memory cells, in accordance with an embodiment of the present invention.
Figure 5B:
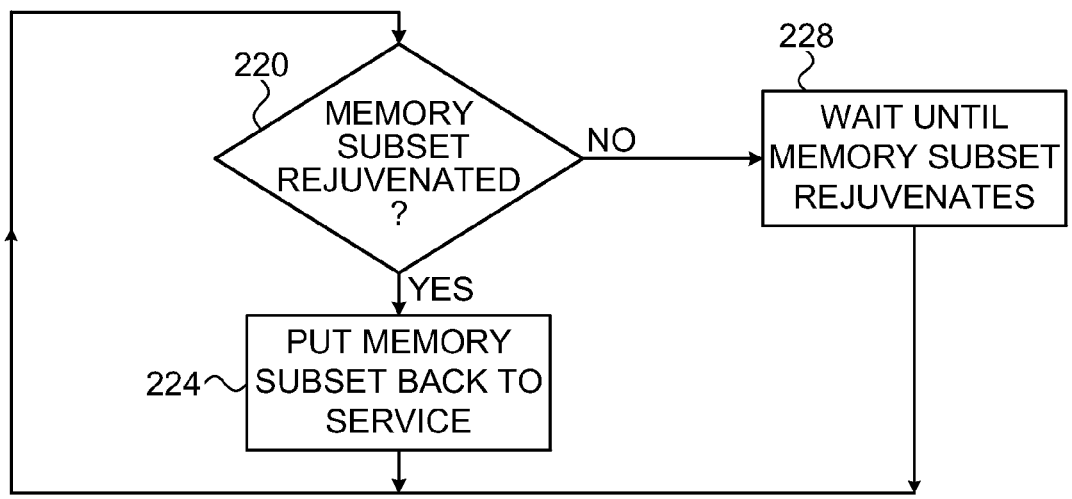

FIGS. 5A and 5B are flowcharts that schematically illustrate an uneven wear leveling method with rejuvenation of memory cells, in accordance with an embodiment of the present invention. The method of FIG. 5A begins with memory controller 32 configuring a small subset of the memory cells to a high P/E rate, at a configure a high P/E rate step 200. The memory controller writes data to the memory, at write data step 204. The controller however writes data at a higher P/E rate to memory cells in the subset configured at step 200 relative to other memory cells.

The memory controller checks if the cells in the configured subset are already worn out, at a check wear level step 208. In case the configured subset is worn out, i.e., degraded to an intolerable level, the memory controller assigns that subset of memory cells to rejuvenation, at a rejuvenation step 212, and loops back to step 200 to configure another subset of memory cells to a higher P/E rate.

Otherwise, the configured memory subset is still usable and the memory controller loops back to step 204 to write subsequent data to the memory. The memory controller may use at step 208 any suitable method to check if cells are worn out. The memory subset that was left aside to rejuvenate may recover and heal after a certain period of time. Then it may be put back to service as described in the method of FIG. 5B below.

The method of FIG. 5B begins with memory controller 32 checks whether the subset of memory cells that was put to rejuvenation at step 220 above is already rejuvenated, at a check rejuvenation step 220. If the subset of memory cells in question is rejuvenated, the memory controller puts that subset back in service and may apply additional P/E cycles to the cells in that subset. Otherwise, the memory controller keeps waiting until rejuvenation is recognized at a wait for rejuvenation step 228. Following either step 224 or 228 the memory controller loops back to step 220 to check if the subset of memory cells has already rejuvenated.

In the above description, the memory controller applies distinct methods separately. It should be appreciated however, that methods and embodiments described above may be applied in any suitable combinations. For example, memory controller 32 may assign one or more subsets of the memory cells to critical latency readout data, and in addition manage other subsets with increased or decreased P/E rates and/or rejuvenation.

In the above description, various techniques for using uneven wear leveling in memory devices were presented. It should be appreciated that in all the methods presented above, the overall memory capacity, i.e., the total amount of data that can be written to the memory device during its lifetime is comparable or better than in memories using methods other than uneven wear leveling.

In some of the methods and embodiments described above, using uneven wear leveling results in improved memory capacity, for example, towards the memory end of life. In some embodiments the extra capacity is provided for the user. Other embodiments may use the extra capacity for improving storage performance, e.g., by increasing the over-provisioning ratio. Methods for adaptive over-provisioning as described, for example, in U.S. patent application Ser. No. 12/822,207, filed Jun. 24, 2010, whose disclosure is incorporated herein by reference. In such embodiments, the extra capacity may be used for adaptive over-provisioning. Alternatively, some of the extra capacity may be allocated for the user and the rest for performance improvement.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:
for a memory that includes multiple memory cells, defining, based on a characteristic of the memory cells, an uneven wear leveling scheme that programs and erases at least first and second subsets of the memory cells with respective different first and second Programming and Erasure (P/E) rates; and
storing data in the memory in accordance with the uneven wear leveling scheme;
wherein defining the uneven wear leveling scheme comprises identifying that the first subset of the memory cells meets a wear-out criterion, and rejuvenating the memory cells in the first subset by temporarily suspending programming and erasure of the first subset.

2. The method according to claim 1, wherein the characteristic comprises readout latency from the memory cells, and wherein defining the uneven wear leveling scheme comprises assigning the first subset of the memory cells for low-latency readout, assigning the second subset of the memory cells for normal-latency readout, and setting the first P/E rate to be lower than the second P/E rate.

3. The method according to claim 1, wherein the characteristic comprises a dependence of a loss in storage capacity of the memory cells on a P/E cycle count of the memory cells.

4. The method according to claim 3, wherein the dependence of the loss in storage capacity on the P/E cycle count is a non-decreasing and concave shaped function.

5. The method according to claim 1, wherein the first P/E rate is set to a higher level than the second P/E rate.

6. An apparatus for data storage, comprising:
a memory, which comprises multiple memory cells; and
storage circuitry configured to:
define, based on a characteristic of the memory cells, an uneven wear leveling scheme that programs and erases at least first and second subsets of the memory cells with respective different first and second Programming and Erasure (P/E) rates;
identify that the first subset of the memory cells meets a wear-out criterion, and to rejuvenate the memory cells in the first subset by temporarily suspending programming and erasure of the first subset; and
store data in the memory in accordance with the uneven wear leveling scheme.

7. The apparatus according to claim 6, wherein the characteristic comprises readout latency from the memory cells, and wherein the storage circuitry is configured to assign the first subset of the memory cells for low-latency readout, to assign the second subset of the memory cells for normal-latency readout, and to set the first P/E rate to be lower than the second P/E rate.

8. The apparatus according to claim 6, wherein the characteristic comprises a dependence of a loss in storage capacity of the memory cells on a P/E cycle count of the memory cells.

9. The apparatus according to claim 8, wherein the dependence of the loss in storage capacity on the P/E cycle count is a non-decreasing and a concave shaped function.

10. The apparatus according to claim 6, wherein the storage circuitry is configured to set the first P/E rate to a higher level than the second P/E rate.

11. An apparatus for data storage, comprising:
- an interface, which is configured to communicate with a memory comprising multiple memory cells; and
- storage circuitry configured to:
    - define, based on a characteristic of the memory cells, an uneven wear leveling scheme that programs and erases at least first and second subsets of the memory cells with respective different first and second Programming and Erasure (P/E) rates;
    - identify that the first subset of the memory cells meets a wear-out criterion, and to rejuvenate the memory cells in the first subset by temporarily suspending programming and erasure of the first subset; and
    - store data in the memory in accordance with the uneven wear leveling scheme.

12. The apparatus according to claim 11, wherein the characteristic comprises a dependence of a loss in storage capacity of the memory cells on a P/E cycle count of the memory cells.

13. The apparatus according to claim 12, wherein the dependence of the loss in storage capacity on the P/E cycle count is a non-decreasing and a concave shaped function.

\* \* \* \* \*